United States Patent [19]

Lerman

[11] Patent Number: 5,586,012
[45] Date of Patent: Dec. 17, 1996

[54] VERTICAL ORGANIZER COMPRISED OF TWO SECTIONS JOINED TOGETHER BY A SPLICE AND SECURED BETWEEN TWO RELAY RACKS

[75] Inventor: Zev Z. Lerman, Chicago, Ill.

[73] Assignee: Homaco, Inc., Chicago, Ill.

[21] Appl. No.: 130,868

[22] Filed: Oct. 4, 1993

[51] Int. Cl.⁶ ...................................................... H02B 1/01
[52] U.S. Cl. .............................. 361/826; 211/26; 361/825
[58] Field of Search .............................. 174/48, 49, 68.1, 174/72 R, 95, 101; 211/26, 189, 175, 191; 248/49, 165; 361/825–829; 379/326, 327, 329, 328, 331–333; 439/526, 709, 712, 715–719, 727

[56] References Cited

U.S. PATENT DOCUMENTS

| | | | |
|---|---|---|---|
| 3,855,427 | 12/1974 | Sinden | 379/327 |
| 4,158,754 | 6/1979 | Yonezaki | 361/829 |
| 4,603,377 | 7/1986 | Kobayashi et al. | 361/826 |
| 4,665,546 | 5/1987 | Brey et al. | 379/327 |
| 4,715,502 | 12/1987 | Salmon | 211/26 |
| 5,153,819 | 10/1992 | Hebel | 361/829 |

*Primary Examiner*—Donald A. Sparks
*Attorney, Agent, or Firm*—Anthony S. Zummer

[57] ABSTRACT

A vertical organizer is mounted between a pair of telecommunication relay racks. Each rack has a backside which is in substantially the same plane as the backside of the other rack. Each rack has an upright defining a side positioned adjacent to and spaced from an upright of the other rack which upright of the other rack defines an adjacent side of the other rack. The vertical organizer includes a vertical trough having opposed sides fixed to adjacent uprights. The trough has a open side on the same side as the backside of the relay racks to provide a channel for positioning a plurality of telecommunication cables between the racks.

5 Claims, 3 Drawing Sheets

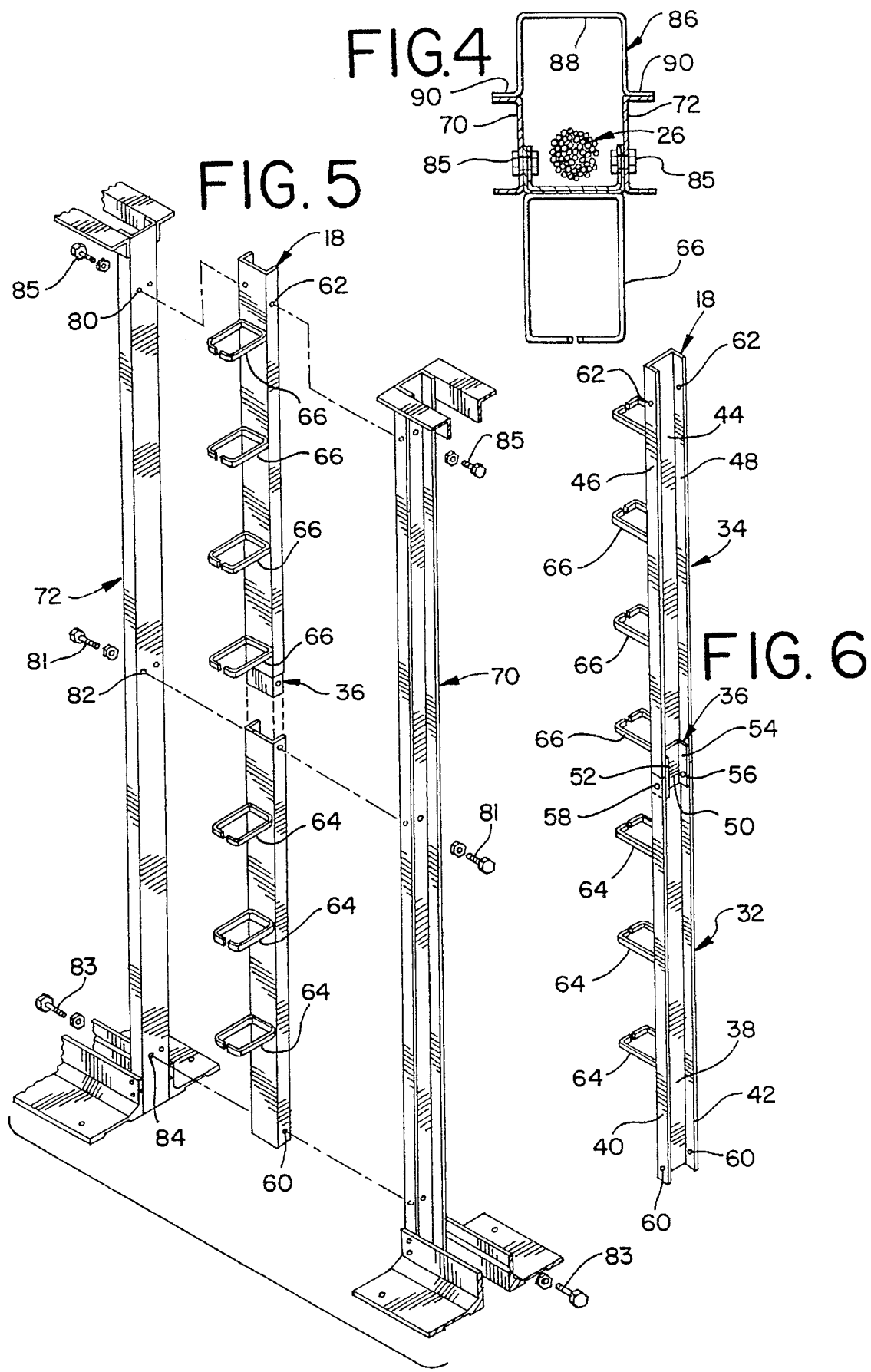

VERTICAL ORGANIZER COMPRISED OF TWO SECTIONS JOINED TOGETHER BY A SPLICE AND SECURED BETWEEN TWO RELAY RACKS

BACKGROUND OF THE INVENTION

Relay racks are widely accepted and used in the telecommunications industry for wire distribution. Installations of two different relay racks are shown and described in U.S. Pat. No. 5,153,819 entitled, "Quick Connect Frame", to Hebel, issued Oct. 6, 1992; and U.S. Pat. No. 4,158,754, entitled, "Mounting Apparatus For Communication Exchange Equipment", to Yonezaki et al, issued Jun. 19, 1979.

A one-hundred twisted pair cable has been widely accepted for use in telecommunication installations. A set of standards for handling cable in a telecommunication installation is set forth in *Electronic Industries Association EIA/TIA Standard* "Commercial Building Telecommunications Wiring Standard" EIA/TIA568, July 1991. Those standards were modified by *EIA/TIA Bulletin* "Technical Systems Bulletin Additional Cable Specifications for Unshielded Twisted Pair Cables" TSB36, November 1991, and further modified by *TIA/EIA Telecommunications Systems Bulletin* "Additional Transmission Specifications for Unshielded Twisted-Pair Connecting Hardware" TSB40, August 1992. The modification in the standards has eliminated the use of one-hundred twisted pair cable for many purposes, and now requires that four twisted pair cable be used. One advantage of using a four twisted pair cable rather than one-hundred is the reduction of cross talk. The improvement in the function and reliability of a telecommunication system by the substitution of four twisted pair cable for one-hundred twisted pair cable has created a problem in wire management.

The number of cables to be handled has been multiplied twenty-five fold. The new standards require that there be twenty-five cables rather than a single one-hundred twisted pair cable. The management of the twenty-five fold increase of cables requires a substantial change in the manner which the cables are now handled.

SUMMARY OF THE INVENTION

The present invention provides an improved vertical organizer mounted between a pair of telecommunications relay racks to handle a large volume of cables and in particular four twisted pair cables. The vertical organizer includes a trough having an open side which is on the same side as the backside of the relay racks. Cable rings are mounted on the front side of the trough. The trough includes, a top section and a bottom section. A splice connects the top section to the bottom section. The splice is fixed to the top section. A fastener secures the splice with the top section to the lower section and to an upright of a relay rack. A second fastener secures the other side of the trough to an upright of another relay rack and secures the splice to the lower section. Each fastener secures the dual functions of fastening the upper section to the lower section securing and the upper and lower sections and to the upright.

BRIEF DESCRIPTION OF THE DRAWINGS

FIG. 4 is an enlarged cross sectional view taken on line 4—4 of FIG. 1;

FIG. 5 is an enlarged exploded view of a vertical organizer and its relative position to a pair of uprights from adjacent relay racks; and FIG. 6 is a perspective view of the vertical organizer of FIG. 5 assembled prior to installation between a pair of relay racks.

DETAILED DESCRIPTION

Figure 1:
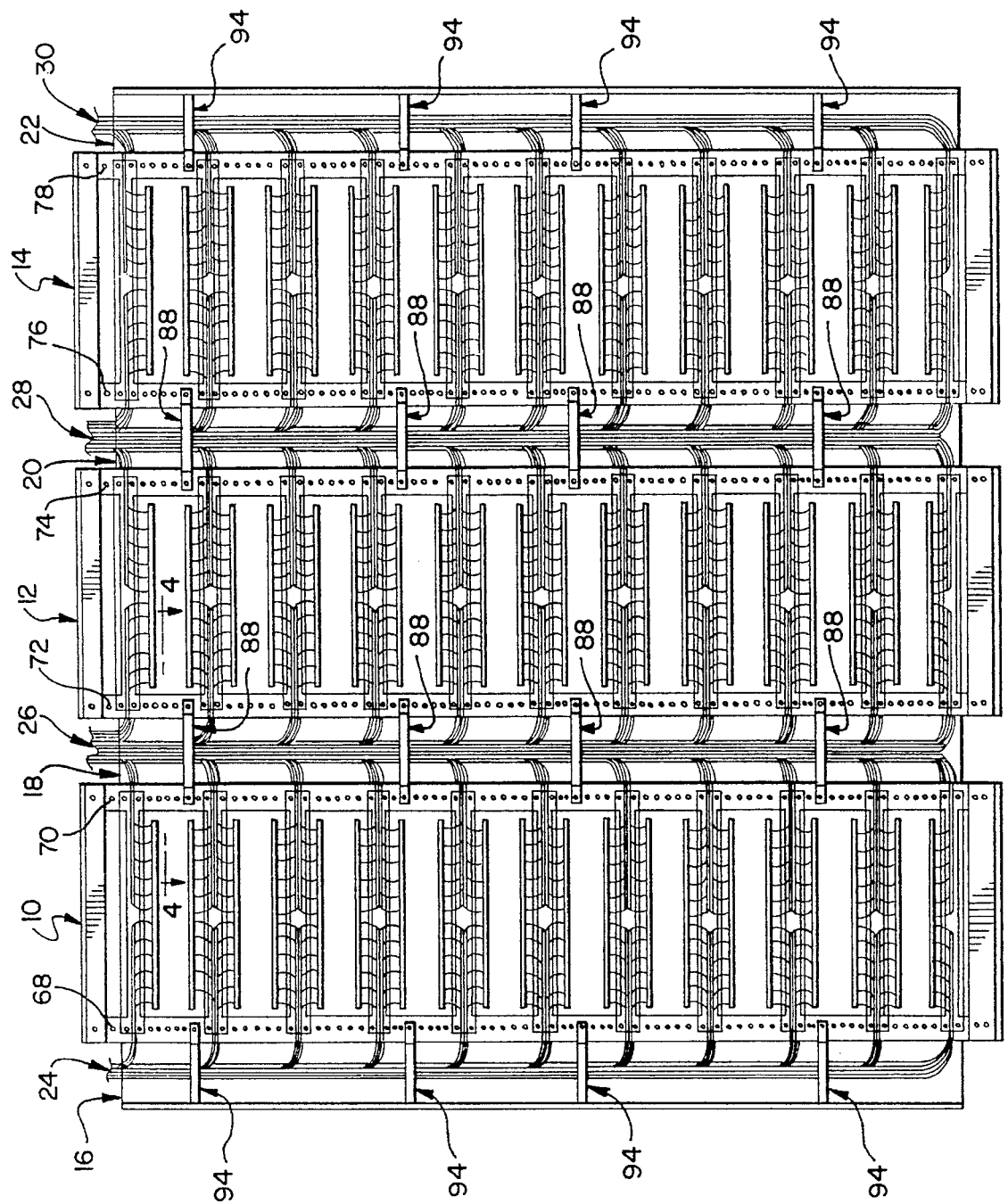
FIG. 1 is a back elevational view of three relay racks connected to each other by vertical organizers each of which vertical organizers embodies the herein disclosed invention.
Figure 2:
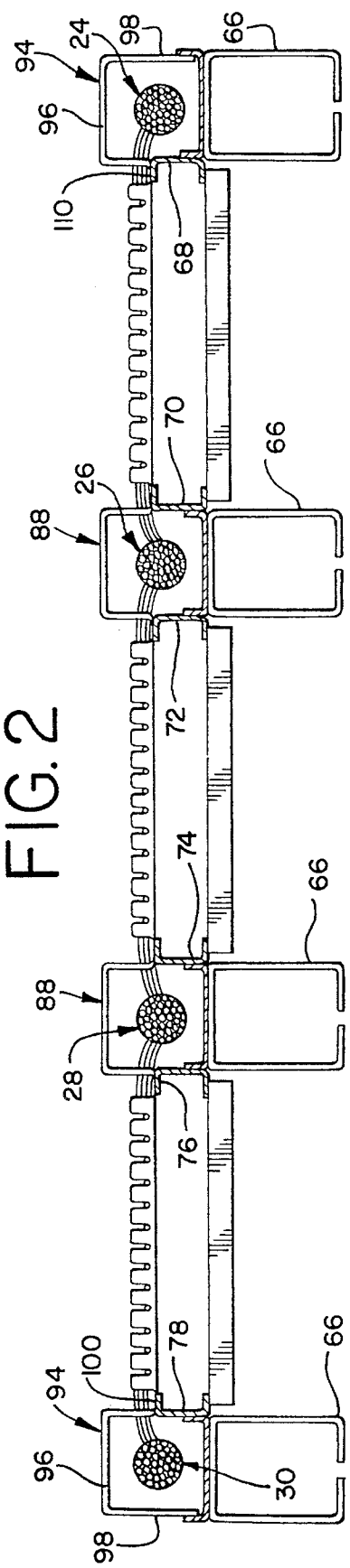
FIG. 2 is a top view of the arrangement of the relay racks shown in FIG. 1.

Referring now to the drawings and especially to FIG. 1, three identical relay racks 10, 12 and 14 are shown therein. The racks are aligned with the backside of each rack in the same plane as the backside of each other rack. The specific construction of the three relay racks is well-known and understood by those skilled in the art. A vertical organizer 16 is shown secured to one side of rack 10 and a second vertical organizer 18 is positioned between and secured to racks 10 and 12. A third vertical organizer 20 is positioned between and secured to racks 12 and 14. A fourth vertical organizer 22 is fixed to one side of rack 14. The construction of each of the aforementioned vertical organizers is identical. Each vertical organizer provides a vertical trough which is open on the same side as the backside of each rack.

A bundle 24 of four twisted pair cables is mounted in vertical organizer 16. The four twisted pair cables from bundle 24 are distributed to one side of relay rack 10. A second bundle 26 of four twisted pair cables is mounted in vertical organizer 18, and those cables are distributed to relay racks 10 and 12. A third bundle 28 of four twisted pair cables is mounted in vertical organizer 20 and distributed to relay racks 12 and 14. A fourth bundle 30 of four twisted pair cables is mounted in vertical organizer 20 and distributed to one side of relay rack 12. In each instance, the bundle of cables is held together by conventional and well-known straps which are not shown or described herein.

FIG. 6 shows the detailed construction of vertical organizer 18 which is identical to the other vertical organizers. Vertical organizer 18 includes, a lower section 32 and an upper section 34 connected to the lower section by a splice 36 to form a trough. Lower section 32 includes, a vertical back 38 with runners 40 and 42 formed integral with opposed parallel edges of vertical back 38 to form a channel for receipt of twisted pair cables. Upper section 34 also has a vertical back 44 with runners 46 and 48 formed integral with opposed parallel edges of vertical back 44. The upper section also forms a channel which is aligned with the lower section. Splice 36 includes, a vertical communication back 50 with ears 52 and 54 formed integral with opposed edges of the back. The outer surface of splice 36 conforms to the interior of the trough. The splice is fixed to the interior of upper section 34, and the splice mates with lower section 32. The splice has a pair of fastener apertures 56 which align with fastener apertures 58 in the upper end of runners 40 and 42. The lower section 32 has lower fastener aperture 60 in runners 40 and 42. The upper section 34 has fastener apertures 62 in the upper end of runners 46 and 48. Three conventional identical split cable rings 64 are mounted on front 38 of lower section 32 on the side opposite the open side. Four split cable rings 66, identical to cable rings 64, are mounted on the side of vertical back 44 opposite the open side. The cable rings 64 and 66 are vertically aligned when the upper section is aligned with the lower section and are used to retain jumper cables on the front side of the relay racks.

Each of the relay racks is of a conventional and well-known construction. Each rack has a pair of uprights which define opposite sides of each of the racks. As may be seen in FIG. 1, rack 10 has a pair of conventional uprights 68 and 70. Rack 12 has a pair of conventional uprights 72 and 74. Rack 14 has a pair of conventional uprights 76 and 78. Each of the uprights as is typical has a plurality of apertures for mounting brackets and other items onto the respective rack.

Looking now to FIG. 5, vertical organizer 18 is shown therein exploded and positioned between uprights 70 and 72. Upright 72 has a plurality of fastener openings which are not shown therein for purposes of clarity. Uprights 70 and 72 have vertical organizer fastener apertures along their sides. An upper aperture 80 is positioned near the uppermost portion of each of the uprights. A mid-aperture 82 is positioned near the mid-point of each upright, and a lower aperture 84 is positioned near the bottom of the upright.

The vertical organizer is assembled by placing splice 36 in engagement with the upper end of lower section 32. The vertical organizer is then positioned adjacent to upright 72. A single fastener 81 (not shown) positioned in aperture 82 extends through aperture 58 in the runner and through aperture 56 in the splice so that the single fastener serves the dual function of securing the upper section to the lower section and securing the vertical organizer to upright 72 of the relay racks. The other side of the vertical organizer is secured to upright 70 in a like manner. Fasteners 83 through the apertures 60 and 84 secure the lower portion of the vertical organizer to the uprights, and fasteners 85 extending through apertures 62 and 80 secure the upper end of the vertical organizer to the uprights. Once the vertical organizer is secured to the uprights, adjacent relay racks are connected to each other. Vertical organizers 16 and 22 are secured to sides of relay racks 10 and 14, respectively.

Figure 3:
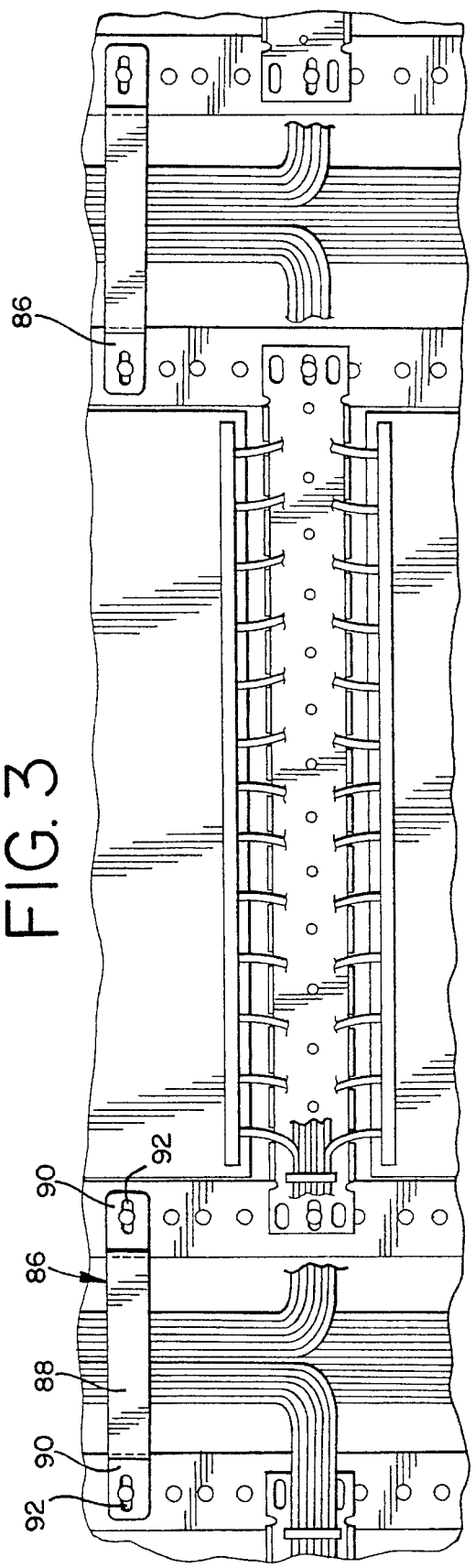
FIG. 3 is an enlarged elevational view of a portion of one of the relay racks shown in FIG. 1 showing vertical organizer mounted on each side of the relay rack.

As may be best seen in FIG. 3, bundles of cables are mounted in the vertical organizers. Cable brackets 86 are mounted on the backside of the uprights to hold the cable bundles in the vertical organizers. Each of the brackets 86 contains a U-shaped body 88 with a pair of outstanding ears 90 formed integral with the ends of the body. Ears 90 have slots 92 to receive fasteners. In the case of the vertical organizers which are not between relay racks, end brackets 94 are provided. The end brackets have a main body 96 with an arm 98 extending therefrom which is positioned inside the trough of the vertical organizer. The body has an integral ear 100 for securing the bracket to the respective upright.

The vertical organizer provides a convenient means for securing adjacent relay racks to each other and providing a trough for receipt of bundles of four twisted pair cables for distribution of the cables along the relay racks. The subject vertical organizers provides an efficient and convenient arrangement for handling a large number of cables in a telecommunications relay racks installation.

Although a specific embodiment has been shown in the accompanying drawings and described in detail above, it is readily apparent that those skilled in the art may make various modifications and changes without departing from the spirit and scope of the present invention. It is to be expressly understood that the scope of this invention is limited only by the appended claims.

What is claimed is:

1. A vertical organizer mounted between a pair of telecommunication relay racks, each of said racks being aligned with the other rack, each rack having a backside in substantially the same plane as the backside of the other rack, each of said racks having an upright defining a respective side positioned adjacent to and spaced from an upright of the other rack defining an adjacent side of the other rack, said vertical organizer including a vertical trough having opposed sides fixed to adjacent uprights, said trough having an open side on the same side as the backsides of said racks cooperating with the upright of each of the adjacent racks to provide a channel for positioning a plurality telecommunication cables between the racks, said trough including; a lower section, an upper section aligned with the lower section, and a splice joining the upper section to the lower section, said upper and lower sections extending between and fixed to adjacent uprights, said lower section fixed to and extending between an adjacent uprights, said upper section aligned with the lower section and fixed to and extending between the adjacent uprights, a fastener extending through the splice, through the trough, and through one of the uprights securing the trough to the upright.

2. A vertical organizer mounted between a pair of telecommunication relay racks, each of said racks being aligned with the other rack, each rack having a backside in substantially the same plane as the backside of the other rack, each of said racks having an upright defining a respective side positioned adjacent to and spaced from an upright of the other rack defining an adjacent side of the other rack, said vertical organizer including a vertical trough having opposed sides fixed to adjacent uprights, said trough having an open side on the same side as the backsides of said racks cooperating with the upright of each of the adjacent racks to provide a channel for positioning a plurality telecommunication cables between the racks, said trough including; a lower section, an upper section aligned with the lower section, and a splice joining the upper section to the lower section, said upper and lower sections extending between and fixed to adjacent uprights, said splice conforming to the interior of the trough at the upper end of the lower section and the lower end of the upper section, said splice fixed to the lower end of the upper section and mating with the upper end of the lower section; a fastener extending through the splice, the lower section, and one of said uprights; and a second fastener extending through the splice, the lower section, and to the other upright, said fasteners securing the upper section to the lower section and securing the trough to adjacent uprights.

3. A vertical organizer mounted between a pair of telecommunication relay racks, each of said racks being aligned with the other rack, each rack having a backside in substantially the same plane as the backside of the other rack, each of said racks having an upright defining a respective side positioned adjacent to and spaced from an upright of the other rack defining an adjacent side of the other rack, said vertical organizer including vertical trough having opposed sides fixed to adjacent uprights, said trough having an open side on the same side as the backsides of said racks cooperating with the upright of each of the adjacent racks to provide a channel for positioning a plurality telecommunication cables between the racks, said trough including; a lower section, an upper section aligned with the lower section, and a splice joining the upper section to the lower section, said upper and lower sections extending between and fixed to adjacent uprights, said trough has; a vertical back extending between the uprights, said vertical back having a pair of opposed parallel edges, a pair of runners fixed to opposed edges of the vertical back, a fastener extending through the splice, through a runner and through one of the uprights to secure the trough to one of the uprights.

4. A vertical organizer mounted between a pair of telecommunication relay racks, each of said racks being aligned with the other rack, each rack having a backside in substantially the same plane as the backside of the other rack, each of said racks having an upright defining a respective side positioned adjacent to and spaced from an upright of the other rack defining an adjacent side of the other rack, said vertical organizer including a vertical trough having opposed sides fixed to adjacent uprights, said trough having an open side on the same side as the backsides of said racks cooperating with the upright of each of the adjacent racks to provide a channel for positioning a plurality telecommunication cables between the racks, said trough including; a lower section, an upper section aligned with the lower section, and a splice joining the upper section to the lower section, said upper and lower sections extending between and fixed to adjacent uprights, each section having a vertical back extending between the uprights, each vertical back having a pair of opposed parallel edges, and a pair of runners fixed to the opposed edges of each of the vertical backs; and a fastener extending through the splice, through a runner, and through one of said uprights to secure the upper section to the lower section and to secure the sections to said one upright.

5. A vertical organizer mounted between a pair of telecommunication relay racks, each of said racks being aligned with the other rack, each rack having a backside in substantially the same plane as the backside of the other rack, each of said racks having an upright defining a respective side positioned adjacent to and spaced from an upright of the other rack defining an adjacent side of the other rack, said vertical organizer including a vertical trough having opposed sides fixed to adjacent uprights, said trough having an open side on the same side as the backsides of said racks cooperating with the upright of each of the adjacent racks to provide a channel for positioning a plurality telecommunication cables between the racks, said trough including; a lower section, an upper section aligned with the lower section, and a splice joining the upper section to the lower section, said upper and lower sections extending between and fixed to adjacent uprights, each of said sections having a vertical back extending between the uprights, each vertical back having a pair of opposed parallel edges, a pair of runners fixed to opposed edges of each of the vertical backs, said splice conforming to the interior of the trough at the upper end of the lower section and the lower end of the upper section, said splice fixed to the lower end of the upper section and mating with the upper end of the lower section; a fastener extending through the splice, through a runner and through one of the uprights securing the trough to said one upright; a second fastener extending through the splice, through the other runner and through the other upright securing the trough to the other upright; and a plurality of split rings mounted on the vertical back of each of the sections on the side of the trough opposite the open side, said split rings being aligned vertically.

* * * * *